S. CANNON.
Seed-Planter.
No. 7,770.
Patented Nov. 12, 1850.
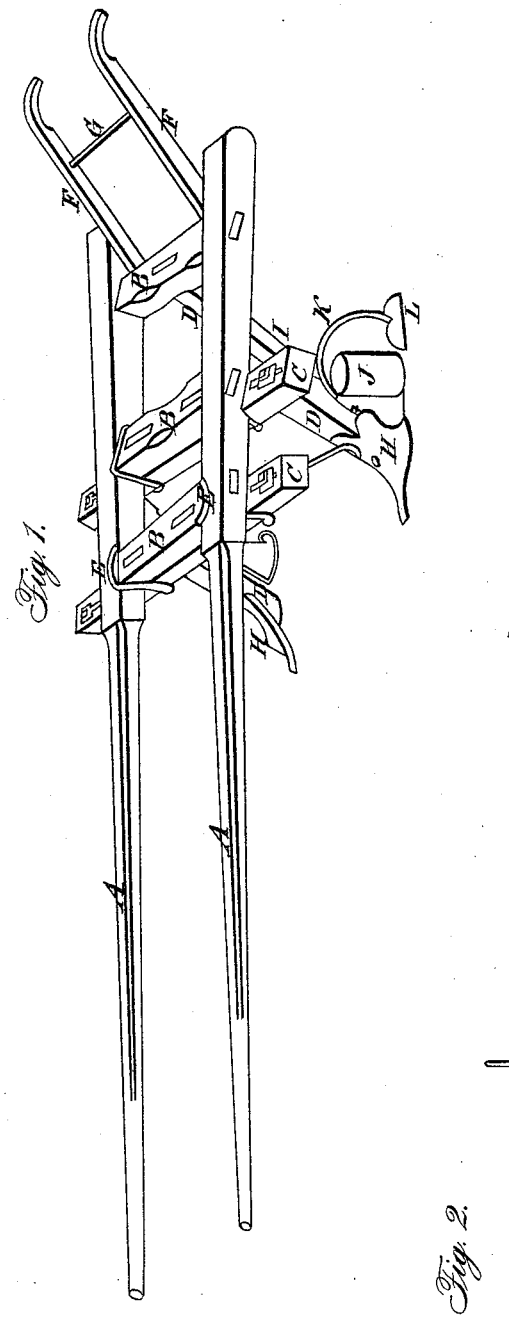
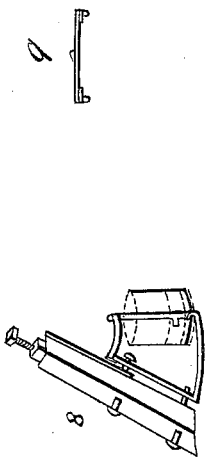
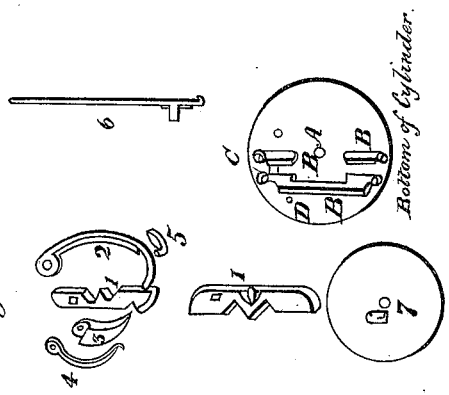

UNITED STATES PATENT OFFICE.

SAMUEL CANNON, OF NEW RICHMOND, PENNSYLVANIA.

IMPROVEMENT IN SEED-PLANTERS.

Specification forming part of Letters Patent No. 7,770, dated November 12, 1850.

*To all whom it may concern:*

Be it known that I, SAMUEL CANNON, of New Richmond, in the county of Crawford and State of Pennsylvania, have invented a new and useful Improvement on a Machine for Seed-Planting; and I do hereby declare that the following is a full, clear, and exact description of the construction and operation of the same, reference being had to the annexed drawings, making part of this specification.

Figure 1 is a perspective of my planter in all its parts connected. Fig. 2 is the sections of the cylinders, designated by letters and figures.

The nature of my invention consists in the attachment of an upright cylinder or cylinders to the rear of a plow or cultivator in such a manner as to adapt it to planting during the process of furrowing the ground.

To enable others skilled in the mechanic arts to make and use my invention, I will proceed to describe its construction and operation.

I construct a pair of shafts, A A, nine and a half feet long, two by three inches square, and connect them by three cross-bars, B B B, about thirty inches long, two by three inches square. I attach two extra cross-bars, C C, to the two front cross bars B B by means of four clips. I place my plow or cultivator-standards D D to hinder bars C, and secured by bolts and nuts and brace secured to front bar C by bolts and nuts. At the bottom of standard D D are plowshares H H. At the rear of standard D D are placed my cylinders J J, containing the seed and machinery for dropping it, secured to standards by the same bolts that fasten on the plows H H. My cylinders are constructed of sheet-iron or such material as is most convenient, about seven inches in diameter, the bottom having cleats for the bolts or slide to ply between and a hole at *e* for the seed to drop through.

I is the bolt or slide, having two cogs, and is thrown back and drops the seed at each two revolutions of the cylinder J J by the spring 2.

3 is the sear or dog that holds the slide while it fills with seed during the second revolution of the cylinder J J.

4 is the sear or dog-spring.

5 is the fly, which prevents the dog from latching the slide or bolt while flying back to drop the seed.

6 is the stationary shaft of the cylinder J, with one cog which moves the slide or bolt.

7 is the place resting on the slats B B B, on which the seed rests, it having a hole, *i*, which drops the seed into the slide.

8 is an outline of a cylinder attached to standard D. 9, single-tree; I, shovel-plow attached to hind standard, D; K, shank to hoe; L, hoe for covering seed; F F, handles; G, round connecting-handles.

When I wish to use my machine for plowing or cultivating among corn and potatoes, and for digging potatoes, I detach C C by taking off the clips. I also detach J and K and place plow-standards to the mortises in B at such distances apart as will work between two rows.

What I claim as my invention, and desire to secure by Letters Patent, is—

The attachment of my vertical cylinders J J to the rear of my plows or cultivator without regard to any particular plow, in combination with its machinery, substantially in the manner and for the purposes herein set forth.

SAMUEL CANNON.

Witnesses:
A. T. STEUART,
THOS. KERR.